United States Patent [19]

Boley

[11] 4,194,393
[45] Mar. 25, 1980

[54] WELL DRIVING AND MONITORING SYSTEM

[75] Inventor: Robert E. Boley, Massillon, Ohio

[73] Assignee: Stallion Corporation, Massillon, Ohio

[21] Appl. No.: 896,046

[22] Filed: Apr. 13, 1978

[51] Int. Cl.² .............................................. G01L 3/14
[52] U.S. Cl. .................................. 73/151; 73/136 R; 417/44
[58] Field of Search ..................... 73/151, 140, 136 R; 417/437, 44

[56] References Cited

U.S. PATENT DOCUMENTS

| | | | |
|---|---|---|---|
| 3,359,791 | 12/1967 | Pantages | 73/151 |
| 3,457,781 | 7/1969 | Elliott | 73/151 |
| 3,838,597 | 10/1974 | Montgomery et al. | 73/151 |
| 4,089,216 | 5/1978 | Elias | 73/140 X |

Primary Examiner—Jerry W. Myracle
Attorney, Agent, or Firm—Maky, Renner, Otto & Boisselle

[57] ABSTRACT

A well driving and monitoring system for a well of the reciprocating rod type utilizes a right angle drive transmission with a load cell therein arranged to monitor torque loads and thus continuously monitor the loads on the reciprocating rod of the pumping unit. The monitoring system utilizes a first set point warning to create a signal which may be transmitted to a central station if exceeded and a second higher set point to shut down the pump if exceeded. A plug in strip chart recorder is employed to permit the operator visually to see the loads during a pump cycle so that analysis, adjustments or corrections can quickly be made. The system is secured against vandalism. In addition, a simplified adjustable counterweight is provided which can readily be altered in capacity and field adjusted as to position. An improved and simplified crank connection on the output shaft of the right angle drive facilitates assembly and disassembly while providing a narrower, cleaner, more compact drive. With the present invention an enclosed drive unit is provided avoiding exposed belt drives normally subject to adjustment, maintenance wear and vandalism.

11 Claims, 7 Drawing Figures

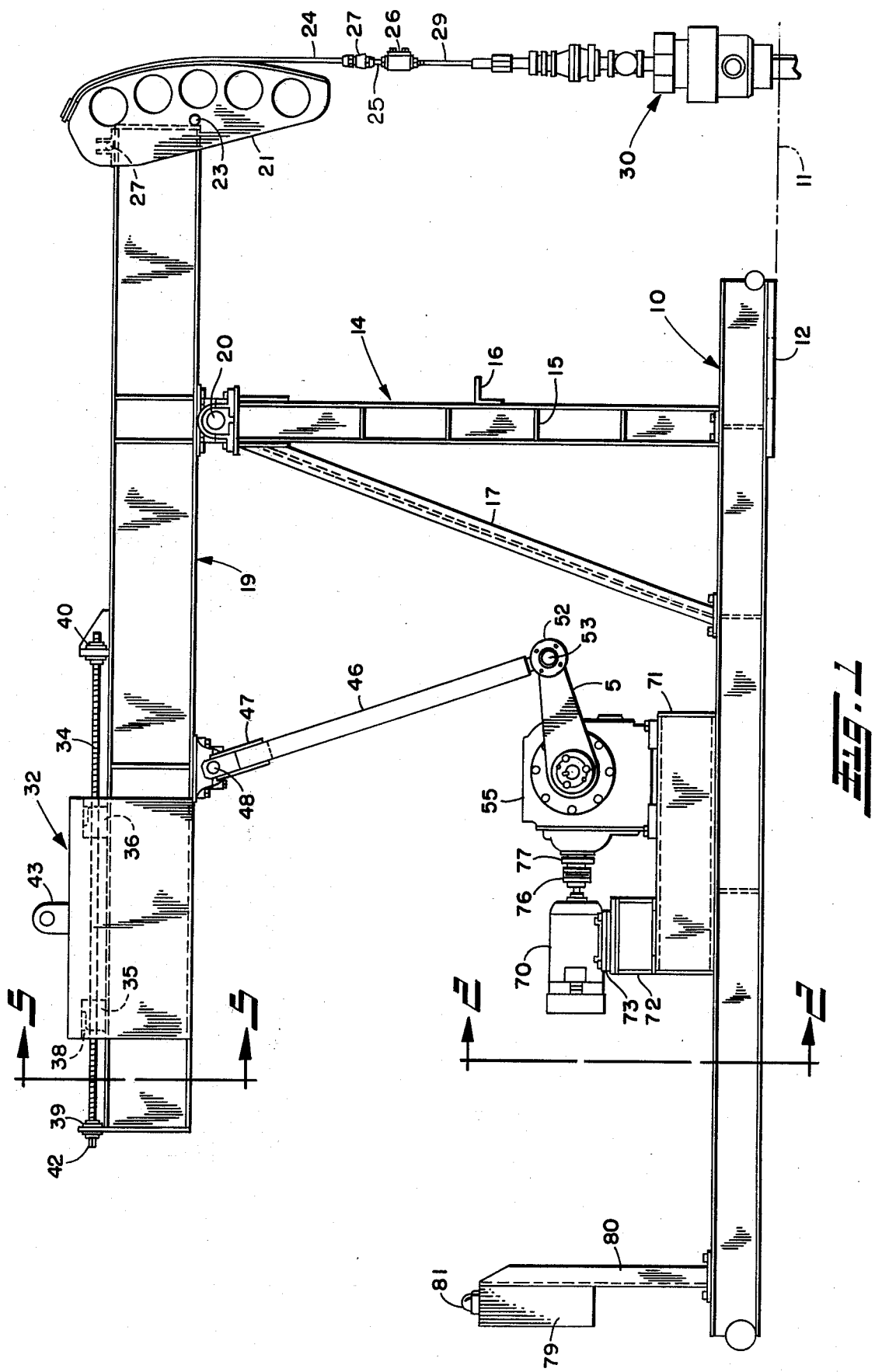

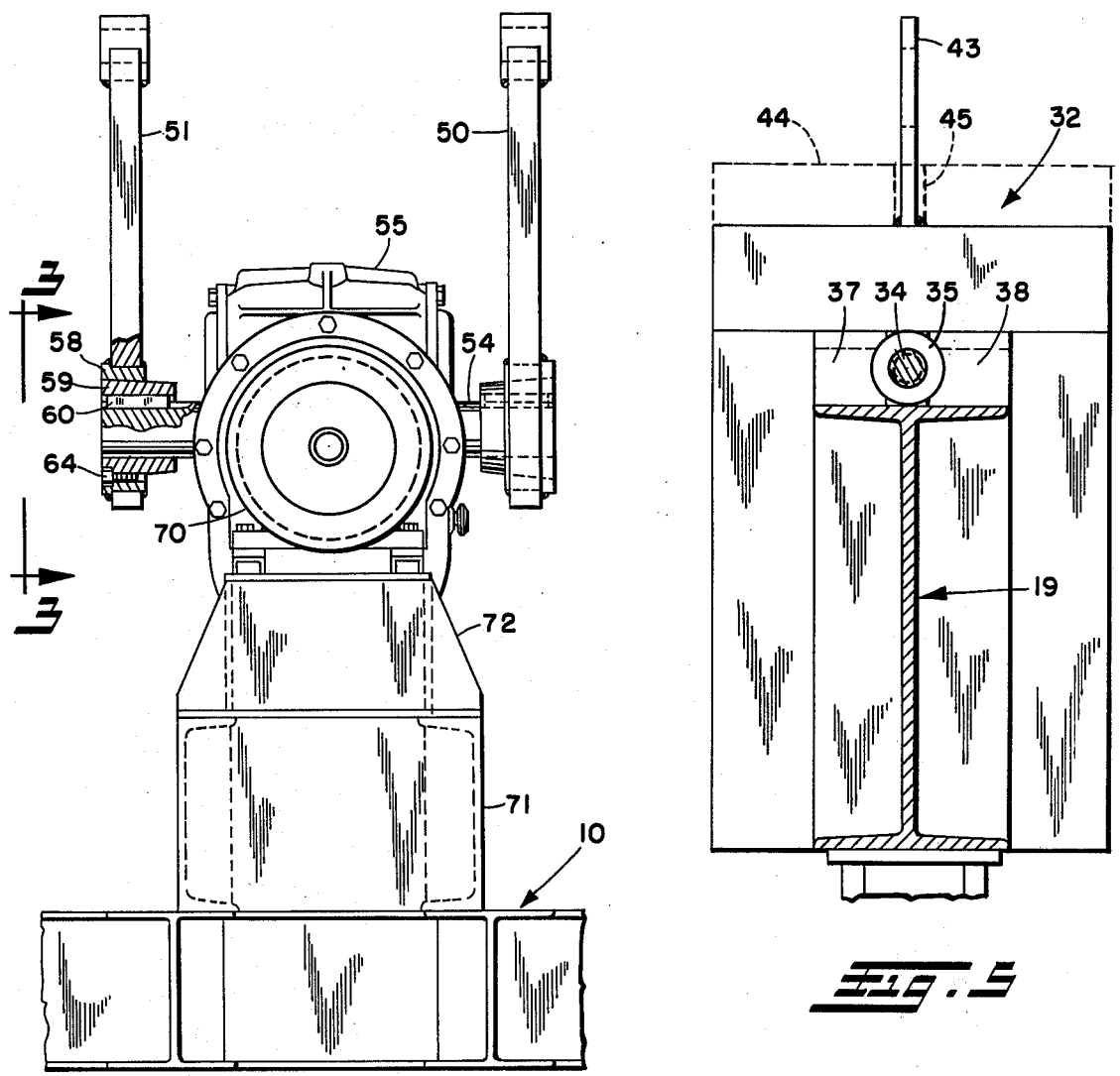
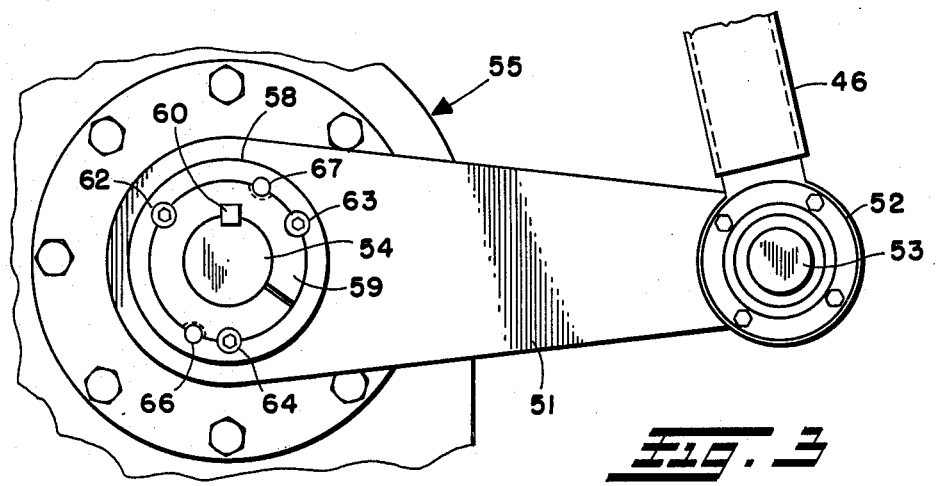

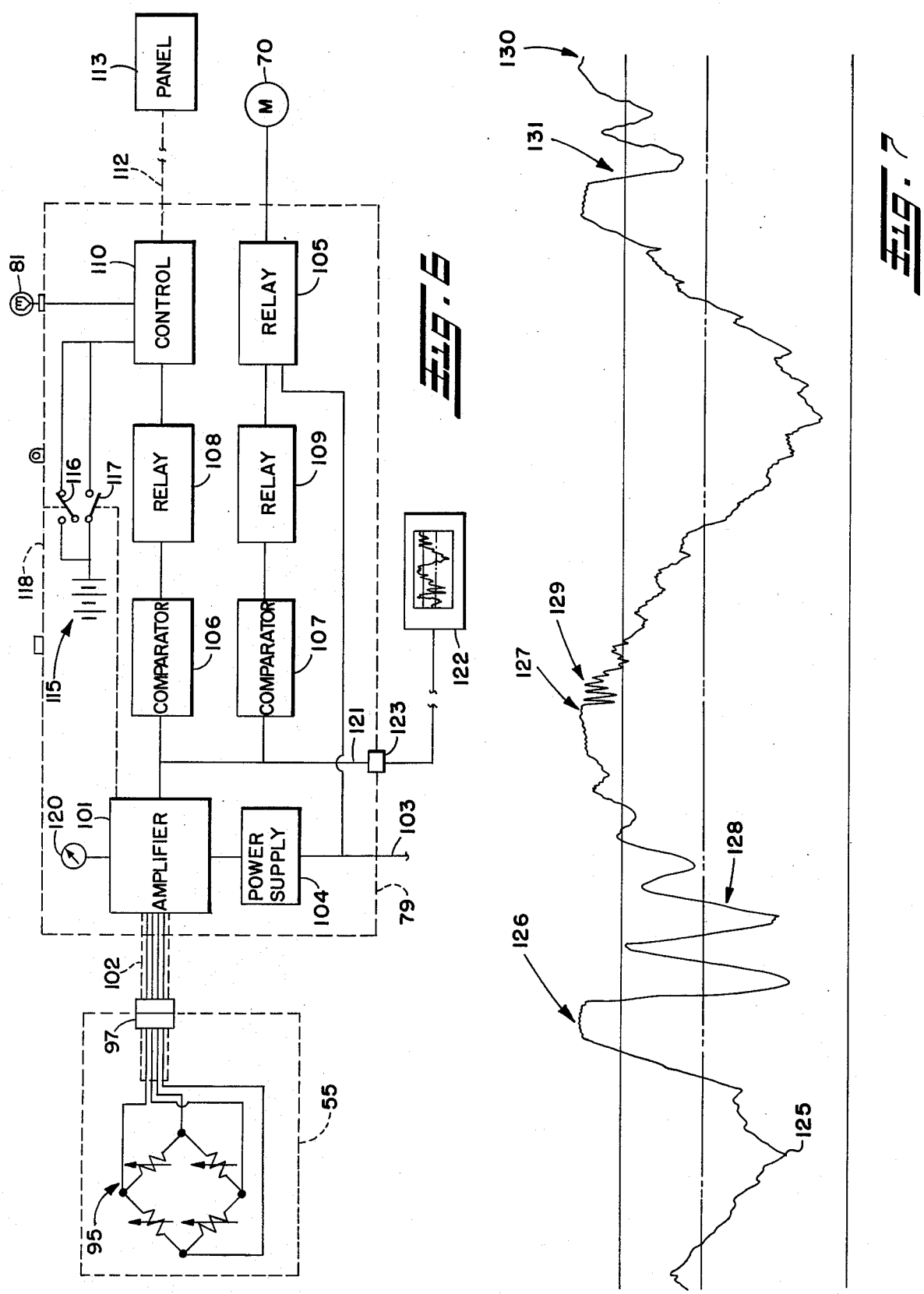

WELL DRIVING AND MONITORING SYSTEM

This invention relates generally as indicated to a well driving and monitoring system and more particularly to an improved driving transmission for a reciprocating rod type well which incorporates a load cell therein operative to provide a warning for excessive polish rod loads and also the ability to continuously graphically record and monitor the well loads.

For many years pumping units which include a walking beam driving a reciprocating rod have been employed to operate sub-surface well pumps. The rod strings operating such sub-surface pumps may be very long. It is not uncommon for such rod strings to be in excess of a mile in length. At such lengths, the rod string is actually substantially elastic and may elongate and contract much as a spring or rubber band producing undesired harmonics. Pumping jacks are generally balanced, either by counterweights on the walking beam or by counterbalanced cranks and the balance desired is for efficiency and to reduce peak polish rod loads and to reduce off bottom acceleration.

Pumping jacks may operate for many years and often do not operate continuously but rather periodically. The load on the polish rod may vary from time to time due to a wide variety of factors such as paraffin build-up, down-hole obstructions, or a change in the consistency of the fluid being pumped. Also, external surface factors can cause the unit to become out of balance. One of the most common problems in maintaining a pumping unit in operation is vandalism. Even farm animals have been known to interfere with the operation of the unit.

For many years it has been desirable to measure the load on the rod string so that an analysis of the performance of the pumping unit and well characteristics may be made. Dynamometers or load cells have been widely employed for this purpose. Commonly, load cells or dynamometers are mounted in an exposed position on the bridle supporting the polish rod. Reference may be had to the recent U.S. Pat. No. 4,043,191 to Mills for an illustration of such dynamometer. Similarly positioned load cells may be seen in the U.S. Pat. Nos. to Elliot 3,457,781 and Hughes 1,094,904. Also, transducers or strain gauges have been employed in various parts of the pumpjack unit. For example, Montgomery et al U.S. Pat. No. 3,838,597 employs a transducer located on the walking beam. Others such as seen in the U.S. Pat. Nos. to Corey 1,948,288 and Mitchell 2,995,048 employ dynamometers which measure the electrical or power load of the motor, but this is generally too remote from the polish rod string to provide the desired accurate measurement. Those employed on the bridle or rod itself are generally exposed and subject to deterioration by weather or vandalism.

It is accordingly desirable to provide a well monitoring device which is completely enclosed and which is permanently installed to provide set point warnings or shut-offs for both electrical and mechanical prime movers in the event of an overload and to enable the loads to be monitored and graphically recorded as desired during the operation of the pump. It is, of course, also desirable to provide a pumping unit wherein the counterbalance can readily be field adjusted. It is of further importance to provide a stable, compact and simplified fully enclosed directly coupled drive for the unit avoiding exposed belt drives which are common in parallel shaft transmissions.

SUMMARY OF THE INVENTION

With the employment of a simplified right angle drive, a load cell may be positioned on the output worm shaft to continuously monitor the load on the transmission and thus the load on the polish rod. Such right angle drive also provides a compact and stable unit which is symmetrical and which avoids exposed parts or belt drives common in parallel shaft transmissions.

It is also an important object of the invention to provide a transmission which includes therein a monitor which will continuously measure the well loads and which may be graphically recorded as desired. The signal produced from the monitor may be employed to trip certain set point comparators, the lower of which may provide a warning, while the higher of which will shut off the pumping unit. The warning set point may energize a warning device at the well location and may also transmit such signal to a remote central location to warn an operator of the excess load having been obtained.

It is also an object of the invention to secure within a locked housing the signal producing equipment which will also transmit a warning-alarm signal if opened.

Still another object is the provision of a simplified counterweight position on the walking beam which can readily be field adjusted as to its position on the beam and which can also readily be altered in capacity.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In said annexed drawings:

FIG. 1 is a side elevation of a pumping unit in accordance with the present invention;

FIG. 2 is an enlarged vertical section taken substantially from the line 2—2 of FIG. 1, with the crank arms extending straight up and the connection of the arm with the output shaft of the transmission partially broken away and in section;

FIG. 3 is an enlarged side elevation of the crank arm connection as seen from substantially the line 3—3 of FIG. 2;

FIG. 5 is an enlarged vertical section through the walking beam illustrating the counterweight as seen from the line 5—5 of FIG. 1;

FIG. 6 is a schematic electrical diagram of the load monitor and the electrical components within the secured control panel; and FIG. 7 is an exemplary section of a strip chart obtained from a strip chart recorder showing a substantially complete well pumping cycle.

DESCRIPTION OF THE PREFERRED EMBODIMENT

Figure 4:
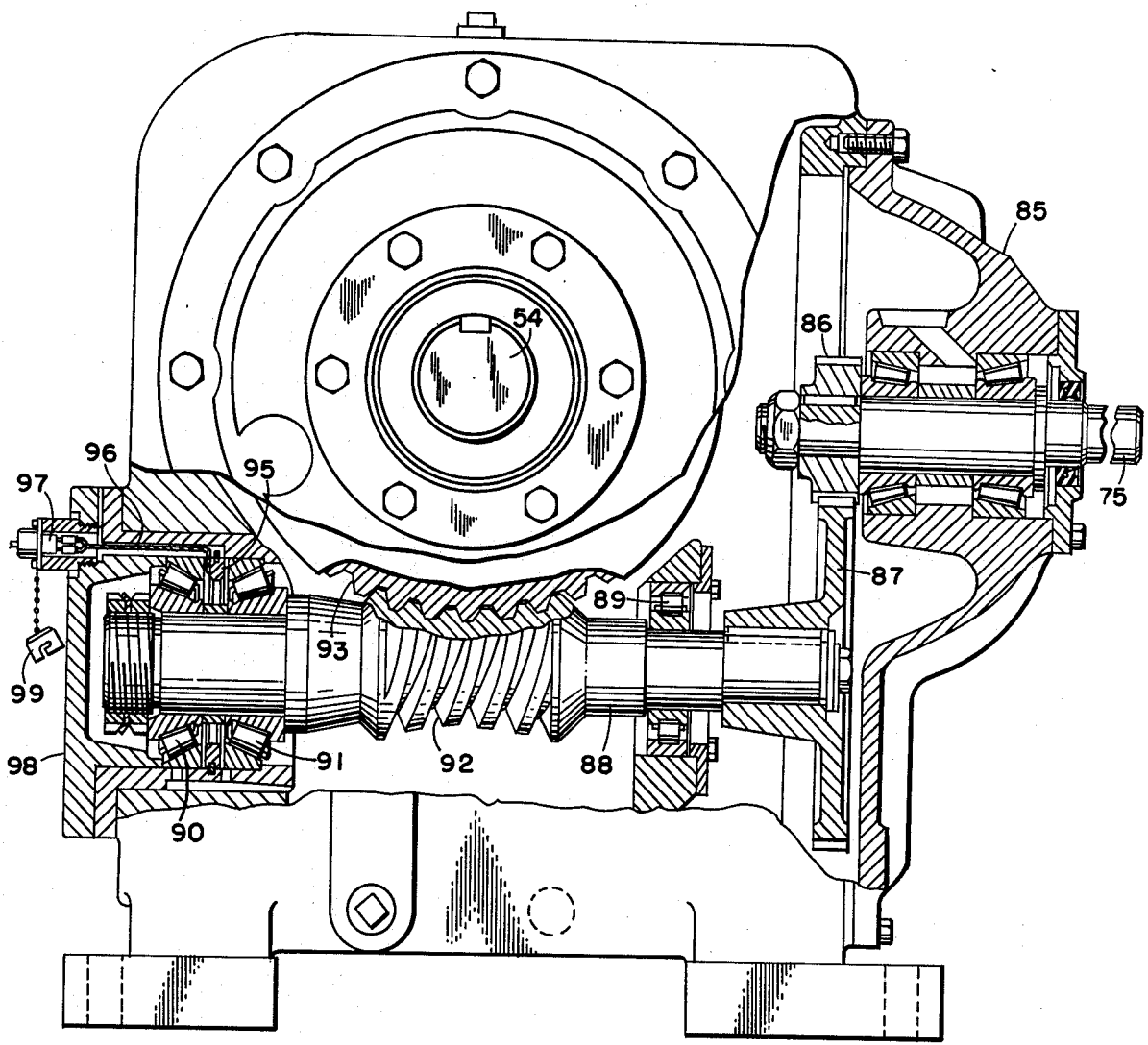
FIG. 4 is an enlarged side elevation, partially broken away and in section, of a preferred transmission in accordance with the present invention illustrating the position of the load monitor on the worm shaft within the transmission housing.

Referring first to FIG. 1, there is illustrated a pumping unit in accordance with the present invention. The pumping unit is mounted on a fabricated skid type base frame 10 which may readily be leveled using a portable jack and supported on the ground 11 using cross ties or sleepers as indicated at 12. Secured to and projecting upwardly from the base is the A-frame sampson post 14, one leg of which may include a built-in ladder as seen at 15. The legs of the frame may be interconnected by the angle 16 and a diagonal brace is provided at 17. The top of the sampson post supports the walking beam 19 for pivotal rocking movement as indicated at 20. The forward end of the walking beam has secured thereto horse's head 21 which is actually two parallel plates of the configuration shown which are interconnected by the rods 22 and 23 also serving to connect and support the horse's head from the walking beam. Each plate of the horse's head has secured thereto a cable seen at 24, such cables being connected to the spaced upwardly extending adjustable rods 25 of yoke 26 by the three piece collet or swage type connectors seen at 27. The yoke is clamped to the upper end of the polish rod 29 which extends for reciprocation downwardly into the wellhead 30.

The opposite end of the walking beam 19 supports a counterweight shown generally at 32 which is in the form of an inverted U-shape weight straddling the beam 19 and which may be adjusted therealong by rotating adjusting rod 34 threaded in nuts 35 and 36 secured to the interior of the counterweight. The bight portion of the counterweight also includes a pair of angle members seen at 37 and 38 at each end which support the counterweight for sliding movement on top of the walking beam. The adjusting rod is journaled by means of suitable bushing and thrust collars at 39 and 40 in the brackets indicated on the top of the beam. The rearwardly projecting end of the screw is provided with a square head as indicated at 42 so that when the walking beam is tilted rearwardly and locked, the rod may readily be turned by a suitable ratchet wrench or other tool.

The top of the counterweight is provided with an upwardly projecting plate type eye 43 to facilitate the lifting of the counterweight and which also facilitates the placement of additional weights thereon as seen in phantom lines in FIG. 5. Such additional weights may be in the form of plates 44 provided with slots 45 through which the eye 43 projects. In this manner the plate type weights may simply be positioned on top of the counterweight without being further secured.

The walking beam is rocked or oscillated in order to reciprocate the rod string 29 through a pitman 46, the spaced arms of which are interconnected at the top through a clevis 47 which is pivoted at 48 to the underside of the walking beam. The arms of the pitman 46 are each connected to the exterior of the distal ends of cranks 50 and 51 by means of the flange bearings 52 and wrist pins 53. Each crank is connected to the symmetrically laterally projecting ends of the output shaft 54 of right angle drive transmission 55 in the manner shown more clearly in FIGS. 2 and 3. The enlarged proximal end of each crank includes a tapered hub welded thereto as seen at 58 within which is secured a tapered bushing 59 which is keyed, as indicated at 60, to the shaft 54. The hub and bushing are secured together by the three screws shown at 62, 63 and 64. Such screws are employed for tightening the bushing on the shaft and fit in mating holes in the hub and bushing with the hub half of the hole threaded but the bushing half of the hole not threaded. When the bushing is removed from the shaft, the three screws are of course removed and two of the three are then employed in the holes 66 and 67 at the interface between the bushing and hub with the bushing half of the hole being threaded and the hub half of the hole not threaded. In this manner the two screws act as jacks for readily removing the bushing from the shaft. Such bushings and hubs are generally commercially available. In any event the cranks may readily be secured on the shaft and removed therefrom and be precisely aligned. Such construction includes no protruding flanges, fasteners, or the like and presents a compact and safe flush design.

As seen in FIGS. 1 and 2, the transmission 55 as well as its drive motor 70 are mounted on a stand 71 situated on the base 10, such stand including a slightly elevated portion 72 for the motor 70. As indicated, the motor is mounted on its pedestal 72 through spacers or shims 73 to be in substantially direct alignment with the input shaft 75 of the transmission. The stand supports both the motor and transmission well above ground level thus reducing exposure to dust in dry seasons or water damage in winter or spring.

The shaft of the motor is connected to the input shaft of the transmission through a flexible shaft coupling 76 and a brake 77 which includes a brake operating lever, not shown, which may be employed to lock the transmission and thus the walking beam and polish rod in any desired position.

Also, as seen in FIG. 1, there is supported a control panel 79 on frame 80 projecting from the base and as hereinafter described such control panel may be locked against entry. A warning light 81 is positioned on top of the control panel. The contents of the control panel or box will hereinafter be more clearly described in connection with FIG. 6.

Referring now to FIG. 4 it will be seen that the reduction gearing or transmission 55 is of the Hindley worm gear type with the input shaft 75 being journaled in housing cover 85 with the pinion 86 on the inner end thereof driving gear 87 secured to one end of worm shaft 88 to obtain a first reducton. The worm shaft is journaled at one end in the cylindrical roller bearing seen at 89 and at the opposite end by means of the opposed tapered roller (radial and thrust) bearings 90 and 91. The convolute worm 92 drives worm wheel 93 obtaining a second reduction which is in turn keyed to the output shaft 54 which projects symmetrically from both sides of the housing of the transmission. In this manner a double reduction is obtained with the transmission indicated. It will be appreciated that variations in the torque loads on the output shaft 54 will tend to cause minute axial movements of the worm shaft 88. In order to monitor continuously the thrust loads on the worm shaft, which is directly related to the torque loads on the output shaft, there is provided a transducer ring 95 situated between the tapered roller bearings 90 and 91. As seen more clearly in FIG. 6, the transducer ring includes four transducer elements interconnected in the wheatstone bridge fashion seen. The transducer ring is electrically connected at 96 to receptacle 97 in the closure plate 98. When not electrically connected to the control panel 79, the receptacle may be closed by the removable cap seen at 99.

The transmission or gear box illustrated may have a 4:1 primary and a 40:1 secondary reduction or an overall 160:1 ratio. The transmission may be factory sealed with the transducer ring therein. The particular transmission illustrated including a built-in torque control is available from Ex-Cell-O Corporation of Traverse City, Mich., under the well known trademark CONE DRIVE ®.

Referring now to FIG. 6, it will be seen that the transducer 95 in the transmission housing 55 is connected to an instrumentation amplifier 101 situated within control panel 79 through shielded cable 102. Power from an external source seen at 103 is supplied to the instrumentation amplifier through a power supply unit 104. The power source 103 is also connected directly to a motor control relay unit 105 for the motor 70.

The instrumentation amplifier 101 is connected to a first set point comparator 106 and a second set point comparator 107. Such comparators may be set by adjusting a potentiometer and are set at two different levels, both indicating differing levels of excessive loads. The first set point comparator at the set point trips a relay 108 while the second trips a relay 109. The relay 108 actuates a control 110 which includes a further relay energizing the warning light 81. The control 110 also may include a transmitter to send an RF signal indicated by the line 112 to a remote warning panel 113. The remote panel 113 may be centrally located and receive similar signals from diversely located pumping units. In this manner, an operator at a central location will be made aware of an excess load as determined by the set point comparator 106 at the pumping unit illustrated. It will be appreciated that the two warning systems illustrated may be used together or separately.

If a yet higher load is achieved and the set point comparator 107 trips the relay 109, it will through the motor control 105 deenergize the motor or engine 70.

Also, as security against theft or unauthorized entry into the control box, the warning-alarm control 110 may be energized from battery 115 through trip switches 116 or 117, the former being operated by the panel door seen at 118. The latter switch 117 may be operated from the instrumentation amplifier 101 to signal a variety of abnormal conditions such as the unauthorized disconnect of the shielded cable 102.

The instrumentation amplifier 101 may also operate a meter seen at 120 which continuously reads the torque loads and in addition, and more importantly, the instrumentation amplifier provides an analog output 121 to which a portable strip chart recorder 122 may be connected as indicated at 123. In this manner the operator may obtain a graphic record of the loads on the pumping unit through one or a number of cycles thereof for analysis and comparison purposes.

A typical section of a strip chart record thus obtained is seen in FIG. 7.

Referring now to FIG. 7 it will be seen that as the crank starts down from its top dead center, somewhat to the left of the edge of FIG. 7, the rod at this time being down, it reaches a point of maximum torque as indicated at 125 at somewhat less than the halfway point 126 to bottom dead center 127. The variations indicated generally at 128 are usually due to harmonics set up by the stretching and contraction of the rod during the working stroke of the pump. Just beyond the bottom dead center as indicated at 129 the load variations may be due to structural vibrations. From the bottom dead center to the top dead center indicated at 130 the rod is of course moving down with the fluctuations seen at 131 being during the top overhaul transition indicating some loading as the crank approaches top dead center.

In any event with the strip chart recorder, continuous or intermittent records of the performance of the well pumping unit can be readily obtained for comparison and analysis purposes. If the operator sees that the well pumping unit is not performing as it should, the operator may readily adjust the balance of the unit by adjusting the counterweight or perform whatever necessary maintenance may be required such as the cleaning or removal of paraffin or other obstructions.

Typical of the information readily available from the graphic record obtained are: (1) maximum upstroke load; (2) minimum downstroke load; (3) the effectiveness of the counterbalance; (4) the weight of the rod and fluid column; (5) the range of rod stress and rod vibration; (6) the range of rod stress and harmonics; (7) pump pounding due to gas or change in fluid level; and (8) obstructions such as paraffin build-up.

It will be appreciated that the monitoring system of the present invention may equally well be employed even though electric power is not available at the pumping site. Reciprocating engines are commonly employed to drive pumping units but the transmission may nonetheless be provided with the transducer and power supplied to the instrumentation amplifier through an automotive type ignition system or a portable or battery power supply which may readily be brought to the pumping site by an operator. Even the operator's vehicle may be used to obtain the power supplied to the instrumentation amplifier to obtain the monitoring of the system as indicated.

It can now be seen that there is provided a compact and symmetrical well pumping unit which includes a built-in load monitor in the transmission which can be employed to warn of excess loads, shut down the unit in the event of further excess loads, and provide a continuous or intermittent visual record of the performance of the pumping unit.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A well driving system comprising a prime mover and a transmission, said transmission including a shaft subject to axial movement in response to well loads, a transducer mounted on said shaft within said transmission, means to employ the signal produced by said transducer to monitor such well loads, said transmission being a worm gear transmission and said shaft being the worm shaft, said transmission including a worm wheel in mesh with the worm and secured to an output shaft projecting laterally symmetrically on each side of said transmission, cranks connected to each end of said output shaft, each crank including a tapered hub, a mating tapered bushing secured to each end of the output shaft, and screw means securing said hub and bushing together.

2. A well driving system as set forth in claim 1 wherein said transmission includes an input shaft driving said worm shaft through reduction gearing, said input shaft and output shaft being axially aligned.

3. A well driving system as set forth in claim 1 including a set point comparator operated in response to a signal generated by said transducer operative to warn of an overload.

4. A well driving system as set forth in claim 3 including means to transmit such warning to a location remote from the well.

5. A well driving system as set forth in claim 3 including a second set point comparator operated in response to a signal of greater magnitude than that operating the first mentioned set point comparator operative to shut down the pump in the event of an overload.

6. A well driving system as set forth in claim 1 including an instrumentation amplifier connected to said transducer, said amplifier including an analog output to which a strip chart recorder may be connected to provide a continuous graphical representation of the well loads.

7. A well driving system as set forth in claim 1 including an instrumentation amplifier for the signal produced by said transducer, said amplifier including an analog output, and means to connect a recorder to said output to obtain a continuous graphical representation of the well loads.

8. A well driving system as set forth in claim 7 wherein said recorder is a portable strip chart recorder.

9. A well driving system as set forth in claim 8 including an adjustable level warning device operated by said amplifier, and means to transmit a signal to a remote location when said level is exceeded.

10. A well driving system comprising a prime mover and a transmission, said transmission including a shaft subject to axial movement in response to well loads, a transducer mounted on said shaft within said transmission, means to employ the signal produced by said transducer to monitor such well loads, a set point comparator operated in response to a signal generated by said transducer operative to warn of an overload, means to transmit such warning to a location remote from the well, a second set point comparator operated in response to a signal of greater magnitude than that operating the first mentioned set point comparator operative to shut down the pump in the event of an overload, said set point comparators being secured in a locked housing, and means to transmit a signal to a remote location when said housing is opened.

11. A well driving system comprising a prime mover and a transmission, said transmission including a shaft subject to axial movement in response to well loads, a transducer mounted on said shaft within said transmission, means to employ the signal produced by said transducer to monitor such well loads, an instrumentation amplifier connected to said transducer, said amplifier including an analog output to which a strip chart recorder may be connected to provide a continuous graphical representation of the well loads, said instrumentation amplifier being secured in a locked housing, and means to transmit a signal to a remote location when said housing is opened.

* * * * *